(12) United States Patent
Soundararajan et al.

(10) Patent No.: US 9,100,720 B2
(45) Date of Patent: Aug. 4, 2015

(54) METHODS AND APPARATUS TO MEASURE EXPOSURE TO LOGOS IN VEHICLE RACES

(71) Applicants: Padmanabhan Soundararajan, Tampa, FL (US); Alexander Pavlovich Topchy, New Port Richey, FL (US)

(72) Inventors: Padmanabhan Soundararajan, Tampa, FL (US); Alexander Pavlovich Topchy, New Port Richey, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 153 days.

(21) Appl. No.: 13/829,313

(22) Filed: Mar. 14, 2013

(65) Prior Publication Data

US 2014/0270354 A1  Sep. 18, 2014

(51) Int. Cl.
G06K 9/00 (2006.01)
H04N 21/81 (2011.01)

(52) U.S. Cl.
CPC .................................. *H04N 21/812* (2013.01)

(58) Field of Classification Search
None
See application file for complete search history.

(56) References Cited

U.S. PATENT DOCUMENTS

| | | | |
|---|---|---|---|
| 6,545,596 B1 | 4/2003 | Moon | |
| 6,952,558 B2 | 10/2005 | Hardacker | |
| 7,385,515 B1 | 6/2008 | Owen et al. | |
| 7,487,112 B2 | 2/2009 | Barnes, Jr. | |
| 7,917,439 B2 | 3/2011 | Barnes, Jr. | |
| 7,930,716 B2 | 4/2011 | Liga et al. | |
| 8,207,843 B2 | 6/2012 | Huston | |
| 8,229,458 B2 | 7/2012 | Busch | |
| 2008/0219504 A1* | 9/2008 | Adams et al. | 382/103 |
| 2009/0262193 A1 | 10/2009 | Anderson | |
| 2011/0026772 A1 | 2/2011 | Hagan et al. | |
| 2014/0171039 A1* | 6/2014 | Bjontegard | 455/414.1 |

* cited by examiner

*Primary Examiner* — Nirav G Patel
(74) *Attorney, Agent, or Firm* — Hanley, Flight & Zimmerman, LLC

(57) ABSTRACT

Methods and apparatus to measure logo exposure in vehicle races are disclosed. An example apparatus includes a vehicle database containing first time-location data identifying a first set of physical locations of a first vehicle at corresponding points in time, the first vehicle to display a first logo; a camera database containing time-camera view data identifying a set of views of a camera at corresponding points in time; and credit logic to determine whether to credit the first logo with an exposure to the camera based on the first time-location data and the time-camera view data.

32 Claims, 16 Drawing Sheets

1600

| Total Exposures | | |
|---|---|---|
| Logo | Number of Exposures | Duration of Total Exposure |
| 1 | 75 | 2:53 |
| 2 | 103 | 4:20 |
| 3 | 98 | 3:15 |

1602 → 1
1604 → 2
1606 → 3

1600A

| Hispanic Females Ages 21-30 | | |
|---|---|---|
| Logo | Number of Exposures | Duration of Total Exposure |
| 1 | 50 | 2:02 |
| 2 | 81 | 3:01 |
| 3 | 63 | 2:34 |

METHODS AND APPARATUS TO MEASURE EXPOSURE TO LOGOS IN VEHICLE RACES

FIELD OF THE DISCLOSURE

This disclosure relates generally to audience measurement and, more particularly, to methods and apparatus to measure exposure to logos in vehicle races.

BACKGROUND

Advertisements and/or logos are sometimes places on vehicles in automobile races. As the race is viewed by a television audience, the television audience is exposed to the logos on the vehicles.

BRIEF DESCRIPTION OF THE DRAWINGS

FIG. 16 illustrates an example tables that may be stored in the example results database 718 of FIG. 7

DETAILED DESCRIPTION

Many automobile races such as NASCAR™ are televised and viewable by the public over broadcast and/or cable television. These automobile races involve vehicles driving around a track at high rates of speed. Advertisements and/or logos are sometimes displayed on the vehicles in an automobile race by advertisers or other entities that sponsor one or more of the vehicles engaged in the race. As the race is viewed by a television audience, the television audience is exposed to the logos on the vehicles. However, some of the logos on the vehicles may be shown on television more often than others depending on factors such as the television coverage of the race, popularity of the drivers relative to other racers, and/or how the different vehicles perform during the race (e.g., vehicle position relative to other racers during the race).

Advertisers would like to know how often and for how much time their logos are shown on television (e.g., audio/video programming shown by any distribution mechanism such as cable, Internet, satellite and/or terrestrial broadcast) during an automobile race. Such information allows advertisers to gauge the effectiveness of displaying logos on vehicles in automobile races and/or to price logo placements.

Example methods, apparatus, and/or articles of manufacture disclosed herein facilitate measuring the number of times and the amount of time that logos on vehicles in an automobile race are shown to viewers during the race. In examples disclosed herein, each of the vehicles engaged in an automobile race contains a vehicle meter to track the vehicle's location. In some examples, the vehicle meter is provided with location tracking functionality such as a global positions satellite (GPS) system.

Automobile races are filmed and/or recorded by cameras for television broadcast. Some such cameras are stationary, but other such cameras move to better track the racing vehicles. In examples disclosed herein, the cameras filming an automobile race contain camera meters comprising a location tracking device to track the cameras' location. In examples disclosed herein, the camera meters in the cameras also detect the orientation (e.g., the direction that a camera is facing) and zoom setting of the cameras (e.g., the level to which a camera is zoomed in on what it is filming). Examples disclosed herein analyze the locations of the vehicles in an automobile race and the location(s), orientation(s) and zoom setting(s) of the cameras filming the race at each point in time during the race to determine how often and for how much time each of the logos displayed on the vehicles is shown to viewers during the video presentation of the race.

Figure 1:
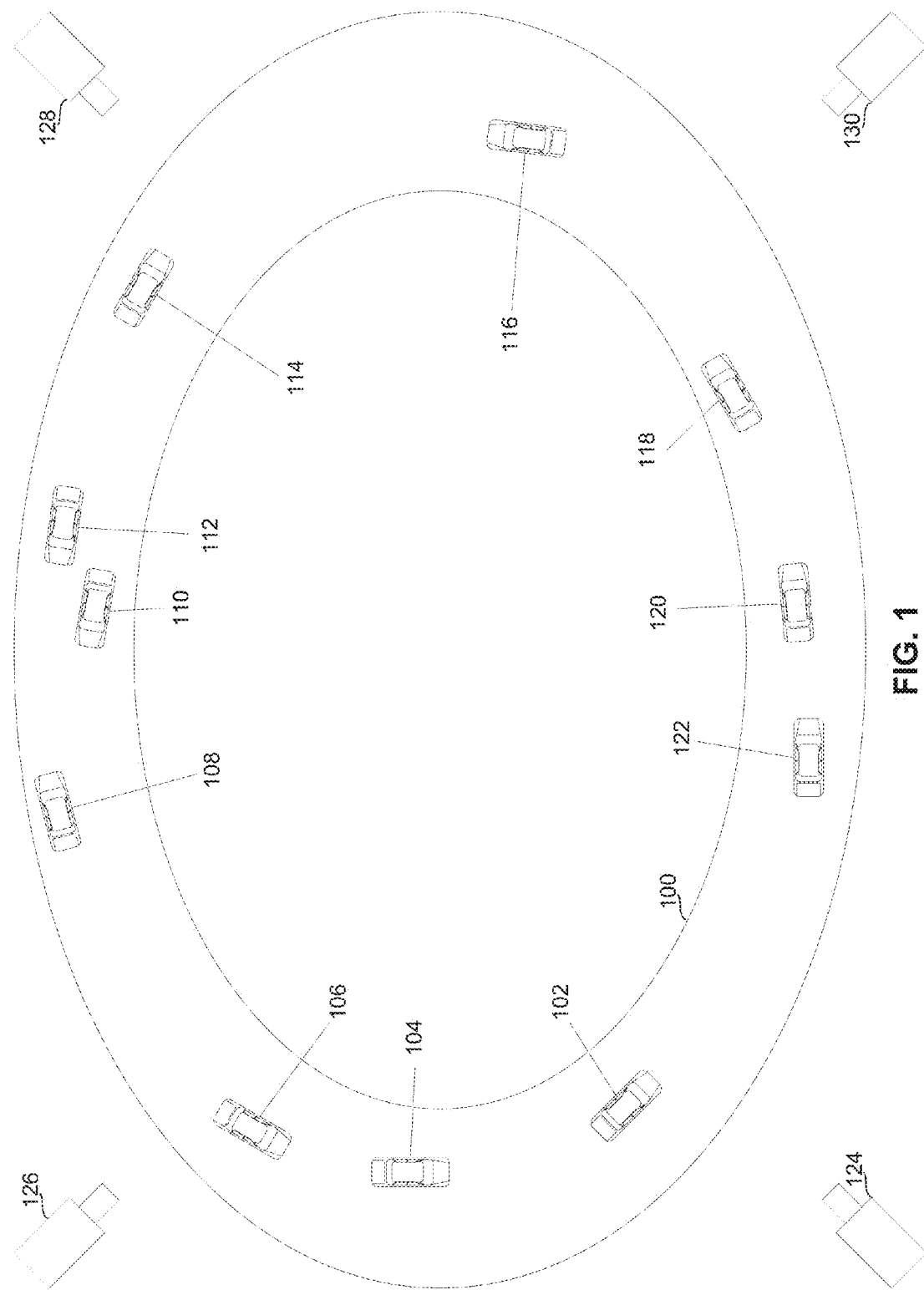
FIG. 1 illustrates an example environment in which an example system constructed in accordance with the teachings of this disclosure is implemented to measure exposure to logos in vehicle races.

FIG. 1 illustrates an example environment in which an example system constructed in accordance with the teachings of this disclosure is implemented to measure exposure to logos in automobile races. The example of FIG. 1 includes an example race track 100, example vehicles 102, 104, 106, 108, 110, 112, 114, 116, 118, 120 and 122 and example cameras 124, 126, 128, 130.

The example vehicles 102-122 of FIG. 1 are engaged in an automobile race, in which the vehicles 102-122 drive around the example race track 100. In the example of FIG. 1, the vehicles 102-122 drive around the race track 100 in a counter-clockwise manner.

Figure 2:
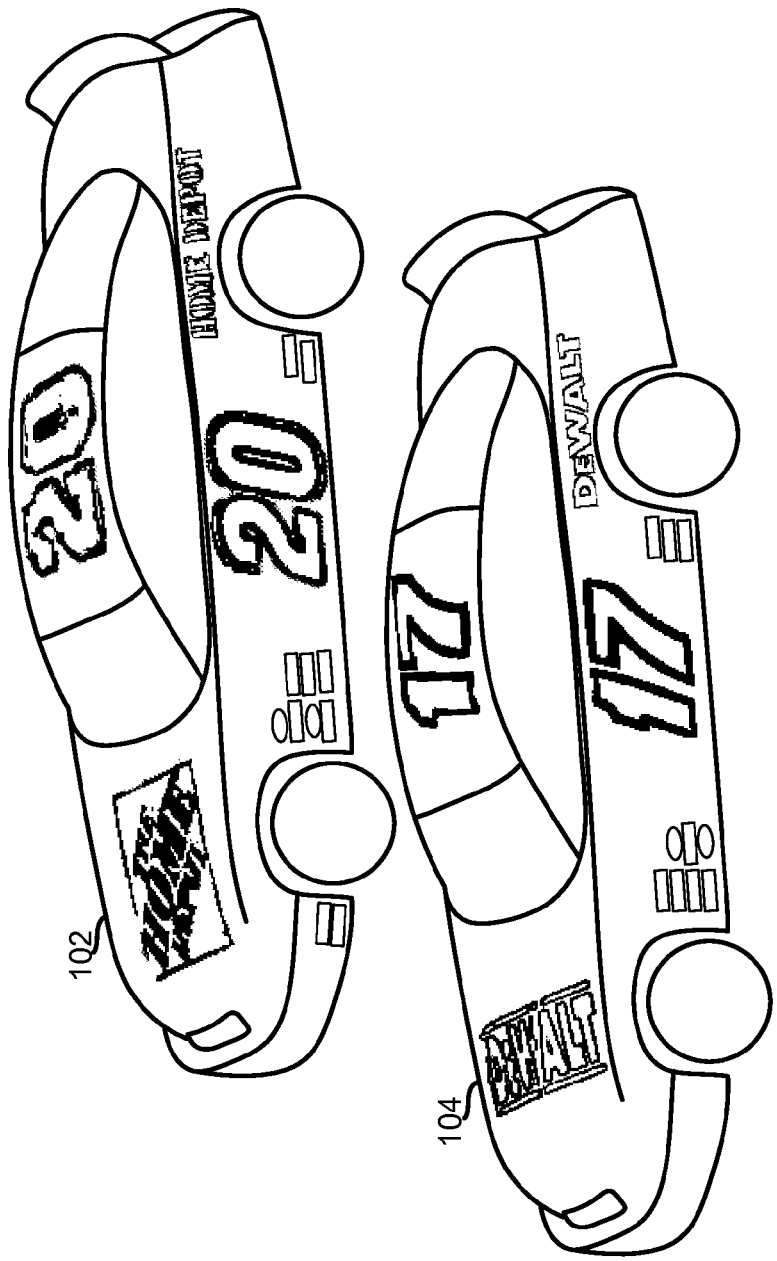
FIG. 2 is a detailed view of two example vehicles of FIG. 1.

The example cameras 124-130 of FIG. 1 film or otherwise record images of the automobile race to generate an audio/visual media presentation of the race. The images collected by the cameras 124-130 are compiled and/or edited into a media presentation that may be transmitted to viewers (e.g., in real time, at a later time, etc.) in any desired distribution mechanism such as television broadcast, Internet multicast, video on demand, pay per view, etc. The manner of distribution is not relevant to this disclosure. In the illustrated example, the cameras 124-130 move (e.g., translate, pivot and/or rotate) and zoom in and/or zoom out to change what they are filming to record the automobile race. In the example of FIG. 2, the view of one of the cameras 124-130 is shown on the television broadcast at an example instant in time. The example camera view(s) being shown in the media presentation change many times during the race.

FIG. 2 illustrates a detailed view of first and second example vehicles 102, 104. In the example of FIG. 2, there are several logos displayed on the exterior of the first and second vehicles 102, 104. As the example vehicles 102, 104 drive around the example track 100 during an automobile race, images of the logos on the vehicles 102, 104 are captured by the example cameras 124-130. During a media presentation of an automobile race, some vehicles are shown in the media presentation more frequently and/or for larger durations than others (e.g., the vehicles leading the race receive more camera time than vehicles near last place). Accordingly, certain logos will be displayed more than others during the media presentation.

Figure 3:
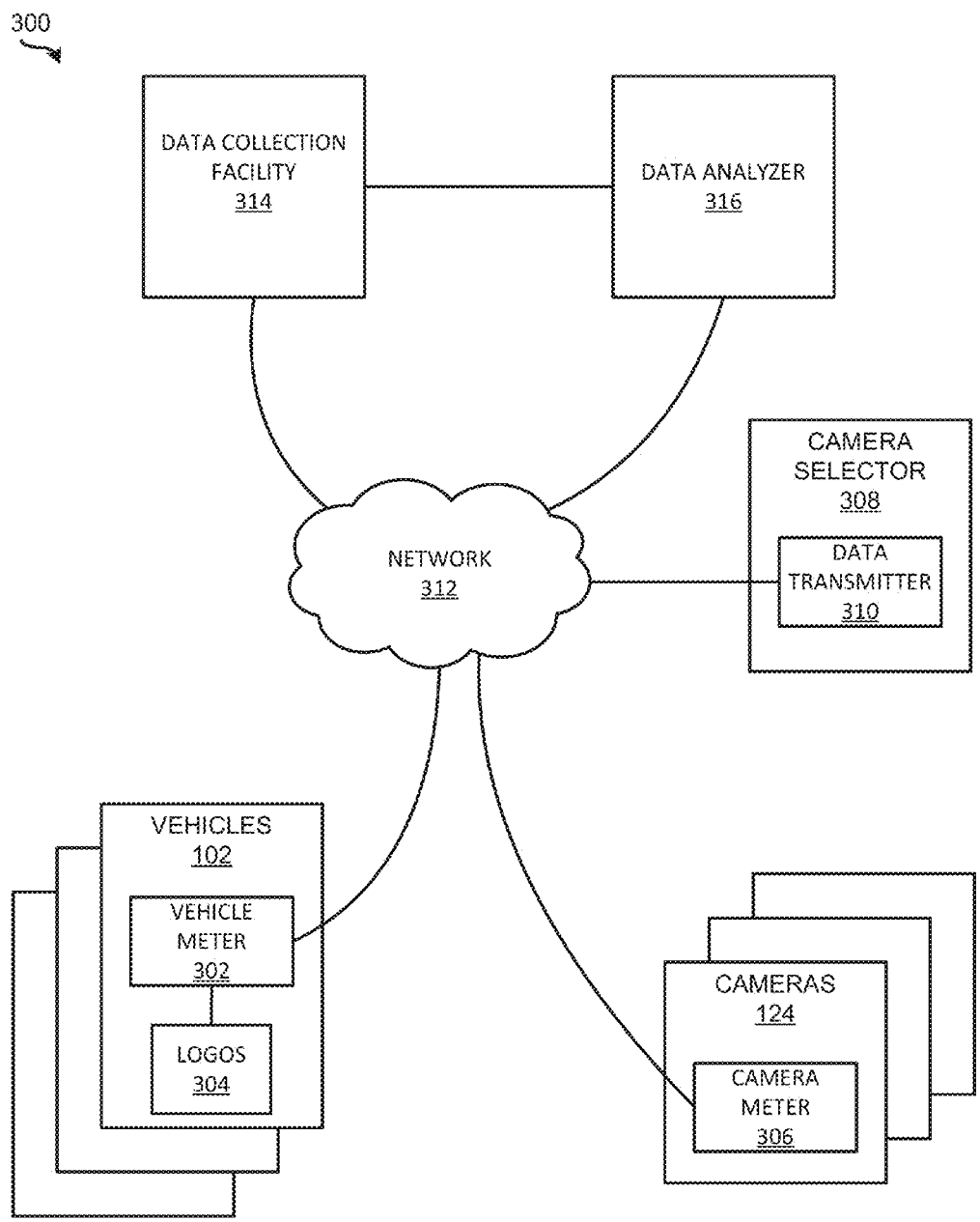
FIG. 3 is a block diagram of an example audience measurement system constructed in accordance with the teachings of this disclosure.

FIG. 3 is a block diagram of an example measurement system 300 constructed in accordance with the teachings of this disclosure. The example measurement system 300 includes vehicles 102, cameras 124, a camera selector 308, a data collection facility 314 and a data analyzer 316. In the illustrated example, the vehicles 102, the cameras 124 and the camera selector 308 are able to communicate with the data collection facility 314 and/or the data analyzer 316 and vice versa via a network 312. The example network 312 of FIG. 3 allows a connection to be selectively made and/or torn down between (1) any of: the example vehicle(s) 102, the example camera(s) 104, and/or the example camera selector 308 and (2) the example data collection facility 314. The example network 312 may be implemented using any type of public or private network such as, for example, the Internet, a telephone network, a local area network (LAN), a cable network, and/or a wireless network. To enable communication via the example network 312, the example vehicles 102, the example cameras 104 and the example data collection facility 314 of FIG. 3 of the illustrated example include a communication interface that enables connection to an Ethernet, a digital subscriber line (DSL), a telephone line, a coaxial cable and/or a wireless connection, etc.

The vehicles 102 of the illustrated example contain a vehicle meter 302 and logos 304. The example vehicle meter 302 monitors the location of the example vehicle 102. An example implantation of the vehicle meter 302 is discussed in further detail in connection with FIG. 4. The example logos 304 are displayed on the exterior of the example vehicles 102. The example logos 304 may be painted on the vehicles 102 or may be posters or other displays affixed to the vehicles 102. The example logos 304 may be advertisements and/or logos of corporations and/or other entities. The example logos 304 may be displayed by corporations or other entities that pay money to sponsor a vehicle 102.

The cameras 124 of the illustrated example film the example vehicles 102 during an automobile race. An example camera 124 contains a camera meter 306 to monitor the location of the camera 124. An example implementation of the camera meter 306 is discussed in further detail in connection with FIG. 5.

The example camera selector 308 selects one of the example cameras 124 at any given time to be used for the media presentation of the automobile race. Throughout the race, the example camera selector 308 (under the direction of an editor and/or producer) selects the video feed from various example cameras 124 whose camera view(s) are to be shown on the television broadcast. This camera selection is typically made by a media operator, producer and/or other individual who decides at any point in time during the race which camera view(s) would best suit the media presentation based on the positioning of the example cameras 124, the position(s) of the vehicle(s), and/or what is happening in the race. The example camera selector 308 is monitored by the example measurement system 300 to determine which example camera 124 is having its camera view presented in the media (e.g., broadcast) at any time during the race. The example camera selector 308 contains a data transmitter 310 to transmit the data from the camera selector 308 to the example data collection facility 314 via the example network 312.

The data collection facility 314 of the illustrated example collects data from the vehicles 102, the cameras 124 and/or the camera selector 308. An example implementation of the data collection facility 314 is discussed in further detail in connection with FIG. 6.

The data analyzer 316 of the illustrated example analyzes data received from the data collection facility 314. In some examples, the data analyzer 316 receives data from the vehicles 102, the cameras 124 and/or the camera selector 308 in addition to, or instead of, receiving data from the data collection facility 314. In some examples, the data analyzer 316 is part of the data collection facility 314. In some examples, the data analyzer 316 receives data from the commercial RACE f/x system by Sportvision™. The Sportvision™ RACE f/x system collects GPS and/or other data from vehicles and video cameras during automobile races in order to superimpose graphics and text over the vehicles during the television broadcast of the race containing information determined from the collected data. In some examples, the example data analyzer 316 gets some or all of the data it receives and analyzes from the Sportvision™ RACE f/x system. In the illustrated example, the data analyzer 316 analyzes data after the race has concluded. In some examples, the data analyzer 316 analyzes data in real-time while the race is occurring.

Figure 4:
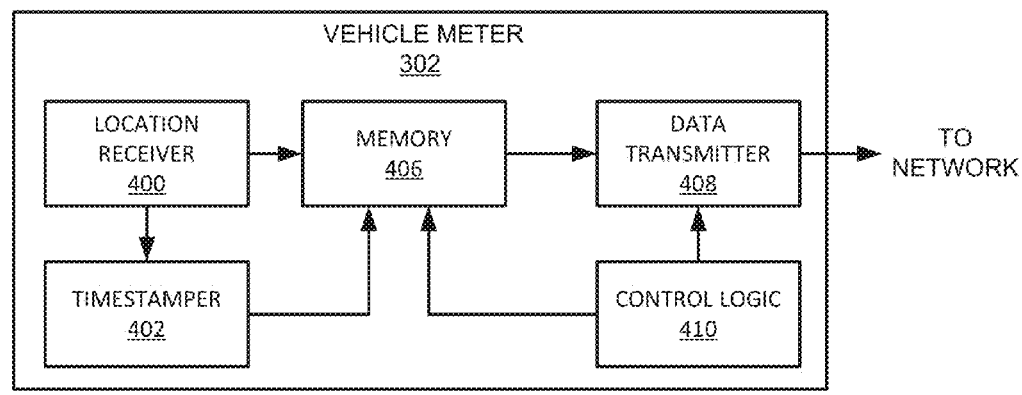
FIG. 4 is a block diagram of an example implementation of the example vehicle meter 302 of FIG. 3.

FIG. 4 is a block diagram of an example implementation of the example vehicle meter 302 of FIG. 3. The example vehicle meter 302 of FIG. 4 includes a location receiver 400, a timestamper 402, a memory 406, a data transmitter 408 and control logic 410.

The location receiver 400 of the illustrated example receives the current physical (e.g., geographic) location of the example vehicle meter 302. In the illustrated example, the location receiver 400 is a GPS receiver that generates a location from the GPS satellite system. In other examples, other devices that can receive and/or detect a current location (e.g., using cell phone triangulation) may be used as the example location receiver 400.

The timestamper 402 of the illustrated example is a clock that records and/or otherwise associates a current time with data. In the illustrated example, the timestamper 402 is a receiver that receives the current time from a cellular phone system. In some examples, the timestamper 402 is a clock that keeps track of the time. Alternatively, any device that can receive and/or detect the current time may be used as the example timestamper 402. In some examples, the location receiver 400 and the timestamper 402 are integrated as a single GPS receiver.

The memory 406 of the illustrated example stores data representative of physical locations received from the location receiver 400 in association with corresponding timestamps received from the timestamper 402 (e.g., time-location data). The example memory 406 communicates with the control logic 410. When the example memory 406 receives an appropriate command from the example control logic 410, the memory 406 sends its stored data to the example data transmitter 408 and clears its stored data.

The data transmitter 408 of the illustrated example receives data from the memory 406 and transmits data to the data collection facility 314 via the network 312. The example data transmitter 408 communicates with the example control logic 410 and transmits the data stored in the memory 406 when instructed to do so by the control logic 410. The example data transmitter 408 also transmits a vehicle ID indicating which of the example vehicles 102 the data is being transmitted from. When the example data collection facility 314 receives the data, it uses the received vehicle ID to keep track of the data received from the example vehicles 102. In the illustrated example, the data transmitter 408 transmits data after a certain amount of time has passed since the previous transmission (e.g., every minute). In some examples, the data transmitter 408 transmits data at the conclusion of the automobile race. In some examples, the data transmitter 408 transmits data when the data in the memory 406 reaches a certain size (e.g., 80% of the capacity of the memory 406) and/or in response to another event (e.g., expiration of a timer).

The control logic 410 of the illustrated example controls the operation of the vehicle meter 104. In the illustrated example, the control logic 410 communicates with the memory 406 and instructs the memory 406 when to send its stored data to the data transmitter 408. In some examples, the control logic 410 monitors the amount of data stored in the memory 406. The example control logic 410 further communicates with the example data transmitter 408 and instructs the data transmitter 408 when to transmit data to the example data collection facility 314 via the network 312.

Figure 5:
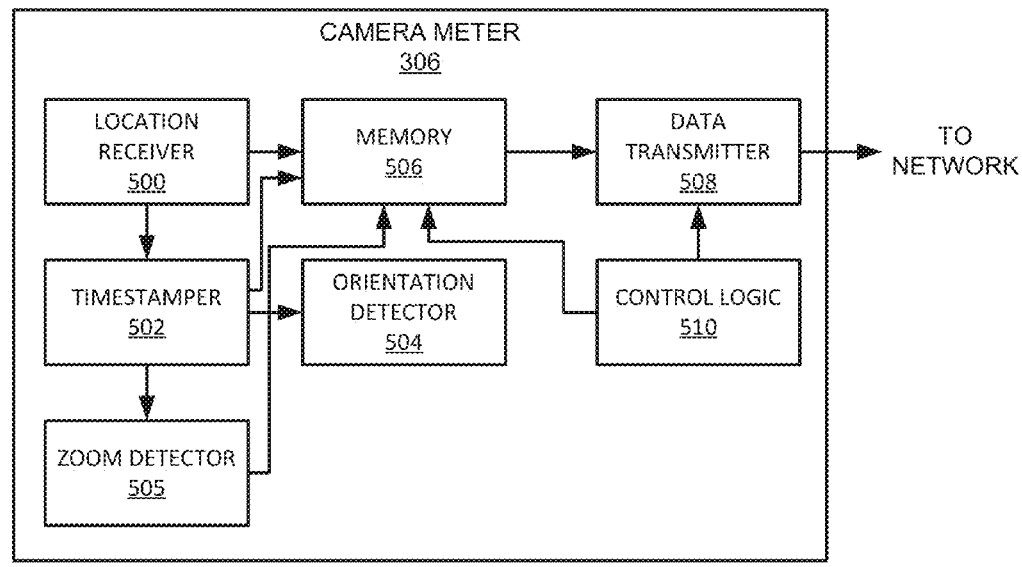
FIG. 5 is a block diagram of an example implementation of the example camera meter 306 of FIG. 3.

While an example manner of implementing the vehicle meter of FIG. 3 is illustrated in FIG. 4, one or more of the elements, processes and/or devices illustrated in FIG. 4 may be combined, divided, re-arranged, omitted, eliminated and/or implemented in any other way. Further, the example location receiver 400, the example timestamper 402, the example memory 406, the example data transmitter 408, the example control logic 410, and/or, more generally, the example vehicle meter 302 of FIG. 4 may be implemented by hardware, software, firmware and/or any combination of hardware, software and/or firmware. Thus, for example, any of the example location receiver 400, the example timestamper 402, the example memory 406, the example data transmitter 408, the example control logic 410, and/or, more generally, the example vehicle meter 302 of FIG. 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example location receiver 400, the example timestamper 402, the example memory 406, the example data transmitter 408, the example control logic 410, and/or, more generally, the example vehicle meter 302 of FIG. 4 are hereby expressly defined to include a tangible computer readable storage device or storage disc such as a memory, DVD, CD, Blu-ray, etc. storing the software and/or firmware. Further still, the example vehicle meter of FIG. 4 may include one or more elements, processes and/or devices in addition to, or instead of, those illustrated in FIG. 4, and/or may include more than one of any or all of the illustrated elements, processes and devices FIG. 5 is a block diagram of an example implementation of the example camera meter 306 of FIG. 3. The example camera meter 306 includes a location receiver 500, a timestamper 502, an orientation detector 504, a zoom detector 505, a memory 506, a data transmitter 508, and control logic 510.

The location receiver 500 of the illustrated example receives the current physical (e.g., geographic) location of the example camera meter 306. In the illustrated example, the location receiver 500 is a GPS receiver that generates a location from the GPS satellite system. In other examples, other devices that can receive and/or detect a current location (e.g., using cell phone triangulation) may be used as the example location receiver 500.

The timestamper 502 of the illustrated example is a clock that associates a current time with location and/or other data. In the illustrated example, the timestamper 502 is a receiver that receives the current time from a cellular phone system. In some examples, the timestamper 502 is a clock that keeps track of the time. Alternatively, any device that can receive and/or detect the current time may be used as the example timestamper 502. In some examples, the location receiver 500 and the timestamper 502 are integrated as a single GPS receiver. In some examples, the timestamper 402 in the vehicle meter 302 is synchronized to the timestamper 502 in the camera meter 306 such that each timestamp received by the timestamper 402 in the vehicle meter 302 is the same as a timestamp received by the timestamper 502 in the camera meter 306.

The orientation detector 504 of the illustrated example detects the orientation of the camera 124 associated with (e.g., containing) the camera meter 306. In the illustrated example, the orientation of the camera 124 comprises the direction that the camera 124 is facing. The camera view of the example camera 124 depends on the orientation of the camera 124.

The zoom detector 505 of the illustrated example detects the zoom setting of the camera 124 containing the camera meter 306. In the illustrated example, the zoom setting of the example camera 124 identifies how far the camera 124 is zoomed in or zoomed out (e.g., 1×, 3×, 10×, 20×, etc.). The angles of view of the example camera 124 depend on the zoom setting of the camera 124.

The memory 506 of the illustrated example stores data representative of: (1) physical locations received from the location receiver 500, (2) orientations from the orientation detector 504 and (3) zoom settings from the zoom detector 505 in association with corresponding timestamps received from the timestamper 502 (e.g., time-camera view data. The example memory 506 communicates with the example control logic 510. When the example memory 506 receives an appropriate command from the example control logic 510, the memory 506 sends its stored data to the example data transmitter 508 and clears its stored data.

The data transmitter 508 of the illustrated example receives data from the memory 506 and transmits data to the data collection facility 314 via the network 312. The example data transmitter 508 communicates with the example control logic 510 and transmits the data stored in the example memory 506 when instructed to do so by the control logic 510. The example data transmitter 508 also transmits a camera ID indicating which of the example cameras 124 the data is being transmitted from. When the example data collection facility 314 receives the data, it uses the camera ID to keep track of the data received from the example cameras 124. In the illustrated example, the data transmitter 508 transmits data after a certain amount of time has passed since the previous transmission (e.g., every minute). In some examples, the data transmitter 508 transmits data at the conclusion of the automobile race. In some examples, the data transmitter 508 transmits data when the data in the memory 506 reaches a certain size (e.g., 80% of the capacity of the memory 506) or in response to another event.

The control logic 510 of the illustrated example controls the operation of the camera meter 306. In the illustrated example, the control logic 510 communicates with the memory 506 and instructs the memory 506 when to send its stored data to the example data transmitter 508. In some examples, the control logic 510 monitors the amount of data stored in the memory 506. The example control logic 510 further communicates with the example data transmitter 508 and instructs the data transmitter when to transmit data to the example data collection facility 314 via the network 312.

While an example manner of implementing the camera meter of FIG. 3 is illustrated in FIG. 5, one or more of the elements, processes and/or devices illustrated in FIG. 5 may be combined, divided, re-arranged, omitted, eliminated and/or implemented in any other way. Further, the example location receiver 500, the example timestamper 502, the example orientation detector 504, the example zoom detector 505, the example memory 506, the example data transmitter 508, the example control logic 510, and/or, more generally, the example camera meter 306 of FIG. 5 may be implemented by hardware, software, firmware and/or any combination of hardware, software and/or firmware. Thus, for example, any of the example location receiver 500, the example timestamper 502, the example orientation detector 504, the example zoom detector 505, the example memory 506, the example data transmitter 508, the example control logic 510, and/or, more generally, the example camera meter 306 of FIG. 5 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example location receiver 500, the example timestamper 502, the example orientation detector 504, the example zoom detector 505, the example memory 506, the example data transmitter 508, the example control logic 510, and/or, more generally, the example camera meter 306 of FIG. 5 are hereby expressly defined to include a tangible computer readable storage device or storage disc such as a memory, DVD, CD, Blu-ray, etc. storing the software and/or firmware. Further still, the example camera meter of FIG. 5 may include one or more elements, processes and/or devices in addition to, or instead of, those illustrated in FIG. 5, and/or may include more than one of any or all of the illustrated elements, processes and devices.

Figure 6:
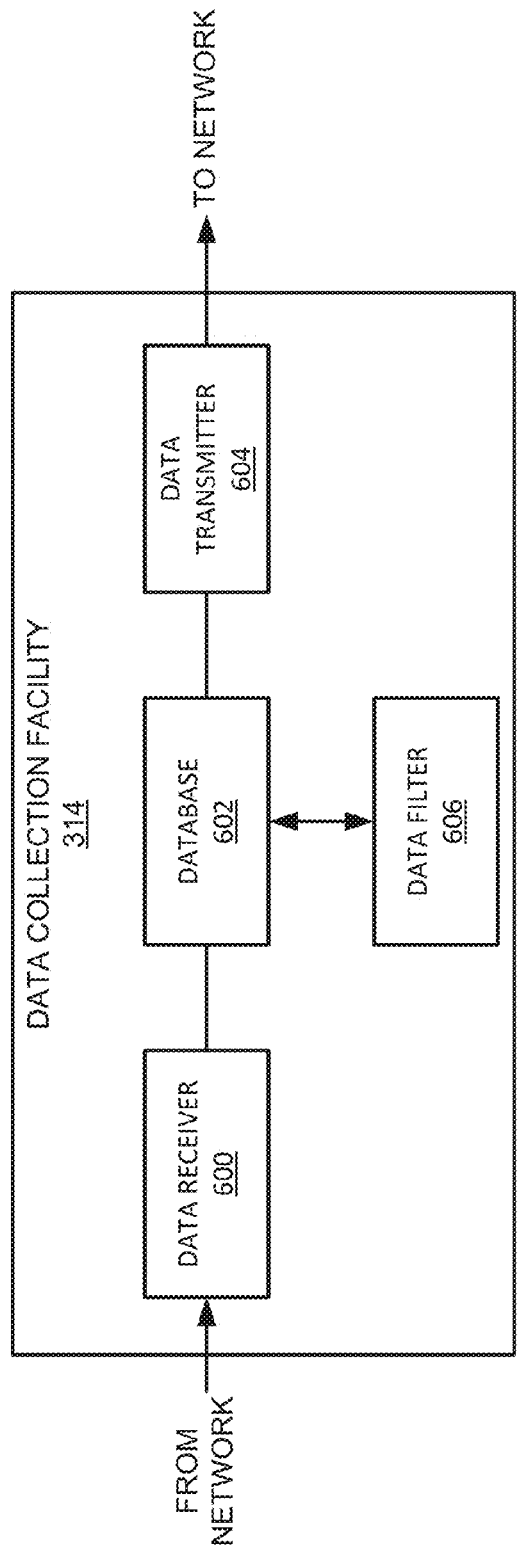
FIG. 6 is a block diagram of an example implementation of the example data collection facility 314 of FIG. 3.

FIG. 6 is a block diagram of an example implementation of the example data collection facility 314 of FIG. 3. The example data collection facility 314 includes a data receiver 600, a database 602, a data transmitter 604, and a data filter 606.

The data receiver 600 of the illustrated example receives data from the vehicle meters 302 and the camera meters 306 of the vehicles 102 and the cameras 324, respectively, and from the camera selector 308 via the network 312. The data received by the example data receiver 600 from an example vehicle meter 302 includes a series of timestamped locations (e.g., time-location data) and a vehicle ID (e.g., an alphanumeric code identifying the vehicle 102 from which the data is received). The data received by the example data receiver 600 from the example camera meter 306 includes a series of timestamped locations, orientations and zoom settings (time-camera view data), and a camera ID (e.g., an alphanumeric code identifying the camera 124 from which the data is received). The data received by the example data receiver 600 from the example camera selector 308 indicates which camera 124 was being used for the television broadcast at corresponding points in time.

The database 602 of the illustrated example receives and stores data from the data receiver 600. The example database 602 sends stored data to the example data transmitter 604 when requested by the data transmitter 604. Any or all databases described herein, including the database 602, may be implemented by any storage device and/or storage disc for storing data such as, for example, flash memory, magnetic media, optical media, etc. Furthermore, the data stored in the database 602 and any or all databases described herein may be in any data format such as, for example, binary data, comma delimited data, tab delimited data, structured query language (SQL) structures, etc. While in the illustrated example the database 602 is illustrated as a single database, the database 602 and any or all databases described herein may be implemented by any number and/or type(s) of databases.

The data filter 606 of the illustrated example uses data received from the camera selector 308 indicating which of the cameras (by camera ID and time) were used at corresponding times in the media to filter the time-camera view data. The example data filter 606 of the illustrated example labels and/or removes data indicating the camera status for images that were not used in the media. The labeled data is deleted, discarded or stored for another usage.

The data transmitter 604 of the illustrated example transmits data stored in the database 602 to the data analyzer 316 via the network 312. The data may be sent periodically, or aperiodically (e.g., in response to receiving a request from the data analyzer 316 and/or in response to any other event). The example data transmitter 604 only transmits the time-camera view data associated with example cameras 124 for times when a camera 124 was the camera 124 selected by the camera selector 308 (i.e., the time-camera view data was not filtered out by the data filter). That is, the example data transmitter 604 only transmits time-camera view data for camera views that were actually used in the media. The example data transmitter 604 does not transmit and the example data analyzer 316 does not analyze camera views that were not used in the media because those camera views were not seen by the audience.

Figure 7:
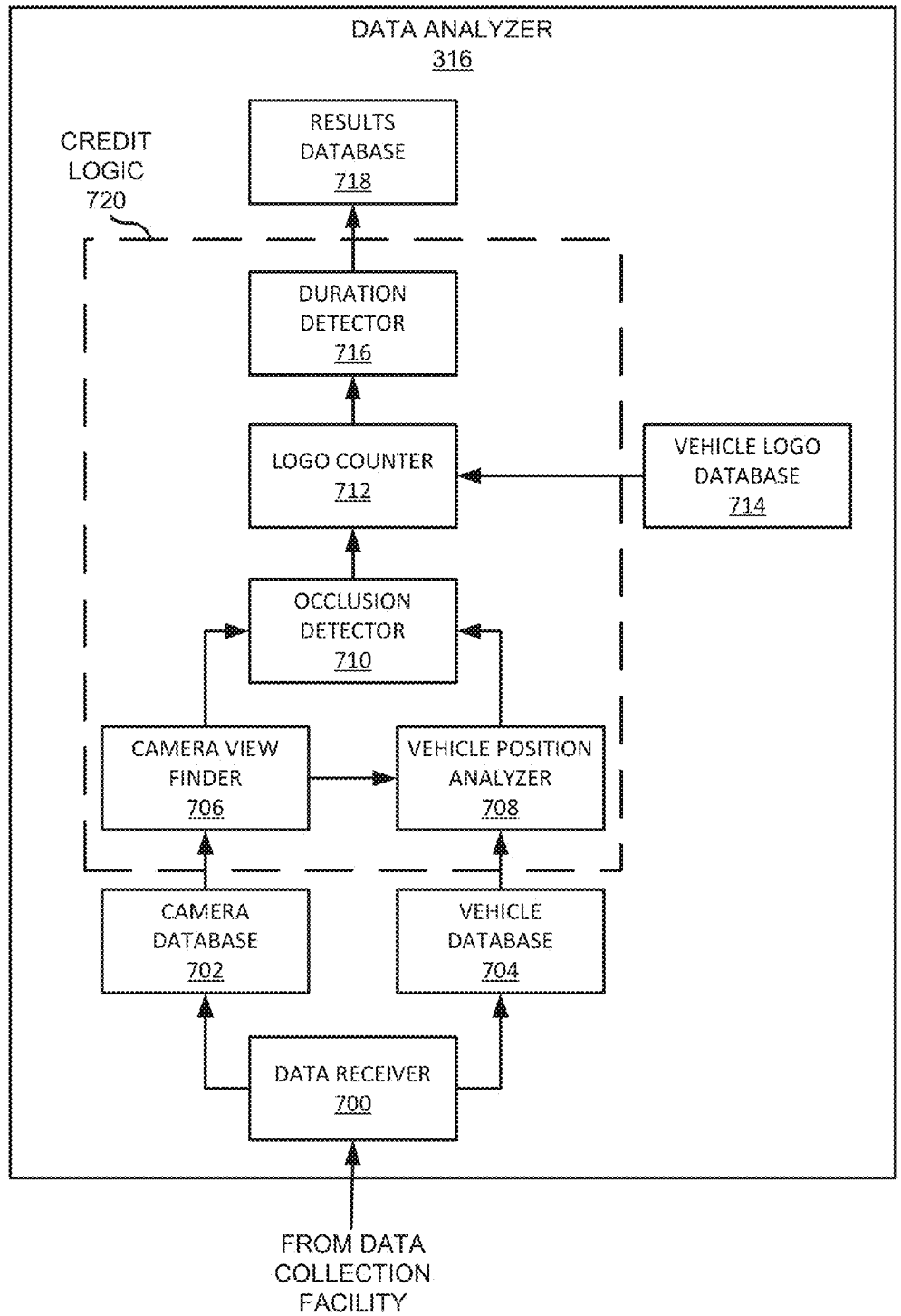
FIG. 7 is a block diagram of an example implementation of the example data analyzer 316 of FIG. 3.

While an example manner of implementing the data collection facility of FIG. 3 is illustrated in FIG. 6, one or more of the elements, processes and/or devices illustrated in FIG. 6 may be combined, divided, re-arranged, omitted, eliminated and/or implemented in any other way. Further, the example data receiver 600, the example database 602, the example data transmitter 604, the example data filter 606 and/or, more generally, the example data collection facility 314 of FIG. 6 may be implemented by hardware, software, firmware and/or any combination of hardware, software and/or firmware. Thus, for example, any of the example data receiver 600, the example database 602, the example data transmitter 604, the example data filter 606 and/or, more generally, the example data collection facility 314 of FIG. 6 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example data receiver 600, the example database 602, the example data transmitter 604, the example data filter 606 and/or, more generally, the example data collection facility 314 of FIG. 6 are hereby expressly defined to include a tangible computer readable storage device or storage disc such as a memory, DVD, CD, Blu-ray, etc. storing the software and/or firmware. Further still, the example data collection facility of FIG. 6 may include one or more elements, processes and/or devices in addition to, or instead of, those illustrated in FIG. 6, and/or may include more than one of any or all of the illustrated elements, processes and devices FIG. 7 is a block diagram of an example implementation of the example data analyzer 316 of FIG. 3. The example data analyzer 316 includes a data receiver 700, a camera database 702, a vehicle database 704, a vehicle logo database 714, a results database 718 and credit logic 720.

The data receiver 700 of the illustrated example receives data from the data collection facility 314 via the network 312. The data received from the example data collection facility 314 includes data associated with the vehicle meters 302 (e.g, time-location data) and/or the camera meters 306 (e.g., time-camera view data).

The data associated with the example vehicle meters 302 includes a series of timestamped locations (time-location data) for each vehicle IDs. The example data receiver 700 stores time-location data associated with the example vehicle meters 302 in the example vehicle database 704. The data associated with the example camera meters 306 includes a series of timestamped locations, orientations and zoom settings (time-camera view data) for each camera ID corresponding to an image used in the media presentation of the race. The example data receiver 700 stores time-camera view data associated with the example camera meters 306 in the example camera database 702.

The camera database 702 of the illustrated example stores time-camera view data associated with the camera meters 104 of the respective cameras 324. The time-camera view data associates corresponding locations, timestamps, orientations, respective zoom settings and camera IDs. The example camera database 702 uses the camera IDs to organize the corresponding locations, timestamps, orientations and zoom settings according to the example camera 324 that sent the data.

The vehicle database 704 of the illustrated example stores time-location data associated with the vehicle meter 302 of the vehicles 102 including corresponding locations and timestamps and vehicle IDs. The example vehicle database 704 uses the vehicle IDs to organize the corresponding locations and timestamps according to the example vehicle 102 that sent the data.

The vehicle logo database 714 of the illustrated example contains the location and identity of each of the logos 304 on the vehicles 102. In the illustrated example, the logo database 714 is compiled either before or after an automobile race by observing the vehicles 102 and the location(s) of the logos 304 on the vehicles 102. The example vehicle logo database 714 is accessible by the example credit logic 720.

The credit logic 720 of the illustrated example determines whether to credit a logo 304 displayed by one of the example vehicles 102 with an exposure in the media. An exposure occurs when an audience is able to see a logo on one of the vehicles during presentation of the media showing the automobile race. The example credit logic 720 includes a camera view finder 706, a vehicle position analyzer 708, an occlusion detector 710, a logo counter 712, and a duration detector 716. It will be understood that a separate audience measurement system will be needed to identify the demographics of the audience present during presentation of the media. For example, the Nielsen Company (U.S.) LLC operates a panelist based audience measurement system to monitor exposure to media such as television broadcasts. That system enlists a large number of people and/or families as panelists. Such persons/families provide their demographic information during a registration process and agree to have their media usage habits monitored. Depending on factors such as the location of the panelist, Nielsen either installs electronic equipment at the panelist location (e.g., a home, a business, etc.) to monitor the media usage at that location or provides the panelist with diaries (paper or electronic) to enable the panelist to log their media usage.

In the electronic approach, a media meter to automatically log the media presented at the panelist location and a people meter to log the persons present during the media presentation are provided. The media meter collects and timestamps data representative of the media presented (e.g., data representing tuned channels, media identifying watermarks or codes, program signatures, etc.). The people meter collects and timestamps data representative of persons present during the presentation of the media. In the non-electronic approach, the completed diaries (representing media exposure at corresponding times to corresponding people) are returned to Nielsen (e.g., to the data collection facility 314) for analysis. The people meter data, the media meter data and/or the diary data collected from many panelist locations is aggregated and statistically analyzed to develop rating for specific media, channels, stations and/or timeslots.

The audience measurement data collected from a system such as that described above can be used with the logo exposure data developed by the credit logic 720 to statistically determine quantities and/or demographics of audience members exposed to the logos. To do so, the timestamps are used to correlate persons/demographics in the audience of the automobile race at times of logo exposures as explained further below The camera view finder 706 of the example illustrated in FIG. 7 determines the camera view (e.g., the physical area viewable by a camera) used to generate the media presentation of the automobile race at a given time by accessing the camera database 702. That is, the example camera view finder 706 determines what portion of the example track 100 is viewable by the audience at a given time.

The vehicle position analyzer 708 of the illustrated example determines the position of one of the example vehicles 102 at a given time during the automobile race by accessing the vehicle database 704. In the illustrated example, the vehicle position analyzer 708 also determines the direction of travel of one of the example vehicles 102 by comparing two positions of the vehicle 102 at slightly different times. The example vehicle position analyzer 708 also determines whether a position of the vehicle 102 is within the camera view determined by the camera view finder 706.

The occlusion detector 710 of the illustrated example determines whether there was an occlusion at a particular time based on the camera view determined by the camera view finder 706 and the position of the other vehicles in the race as determined by the vehicle position analyzer 708. An occlusion occurs when the view of an example vehicle 102 was obstructed from view to the television audience by another vehicle in the race.

The logo counter 712 of the illustrated example determines which of the logos 304 on the vehicles 102 were visible to the television audience at a given time by accessing the vehicle logo database 714 and based on the camera view determined by the camera view finder 706 and the position of the example vehicles 102 and their direction of travel determined by the vehicle position analyzer 708.

The duration detector 716 of the illustrated example determines the amount of time that a logo 304 was visible to the television audience.

The results database 718 of the illustrated example receives and stores the output of the credit logic 624. In the illustrated example, the results database records the number of times that each logo 304 was exposed to the television audience and the duration of each such exposure. In some examples, the data in the results database 718 is confirmed and/or modified by an individual who reviews footage of the automobile race. In some examples, the data in the results database 718 is confirmed and/or modified by a computer using a computer vision algorithm to review footage of the automobile race.

While an example manner of implementing the data analyzer 316 of FIG. 3 is illustrated in FIG. 7, one or more of the elements, processes and/or devices illustrated in FIG. 7 may be combined, divided, re-arranged, omitted, eliminated and/or implemented in any other way. Further, the example data receiver 700, the example camera database 702, the example vehicle database 704, the example camera view finder 706, the example vehicle position analyzer 708, the example occlusion detector 710, the example logo counter 712, the example duration detector 716, the example credit logic 720, the example vehicle logo database 714, the example results database 718 and/or, more generally, the example data analyzer 316 of FIG. 7 may be implemented by hardware, software, firmware and/or any combination of hardware, software and/or firmware. Thus, for example, any of the example data receiver 700, the example camera database 702, the example vehicle database 704, the example camera view finder 706, the example vehicle position analyzer 708, the example occlusion detector 710, the example logo counter 712, the example duration detector 716, the example credit logic 720, the example vehicle logo database 714, the example results database 718 and/or, more generally, the example data analyzer 316 of FIG. 7 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example, data receiver 700, the example camera database 702, the example vehicle database 704, the example camera view finder 706, the example vehicle position analyzer 708, the example occlusion detector 710, the example logo counter 712, the example duration detector 716, the example credit logic 720, the example vehicle logo database 714, the example results database 718 and/or, more generally, the example data analyzer 316 of FIG. 7 are hereby expressly defined to include a tangible computer readable storage device or storage disc such as a memory, DVD, CD, Blu-ray, etc. storing the software and/or firmware. Further still, the example data analyzer 316 of FIG. 7 may include one or more elements, processes and/or devices in addition to, or instead of, those illustrated in FIG. 7, and/or may include more than one of any or all of the illustrated elements, processes and devices.

Flowcharts representative of example machine readable instructions for implementing the example vehicle meter 302 of FIGS. 3 and 4, the example camera meter 306 of FIGS. 3 and 5, the example data receiver 700 of FIG. 7, the example credit logic 720 of FIG. 7, the example camera view finder 706 of FIG. 7, the example occlusion detector 710 of FIG. 7, and the example logo counter 712 of FIG. 7 are shown in FIGS. 8-15. In these examples, the machine readable instructions comprise a program for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 8-15, many other methods of implementing the example vehicle meter 302, the example camera meter 306, the example data receiver 700, the example credit logic 720, the example camera view finder 706, the example occlusion detector 710, and the example logo counter 712 may alternatively be used. For example, the order of execution of the blocks may be changed, and/or some of the blocks described may be changed, eliminated, or combined.

As mentioned above, the example processes of FIGS. 8-15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 8-15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

Figure 8:
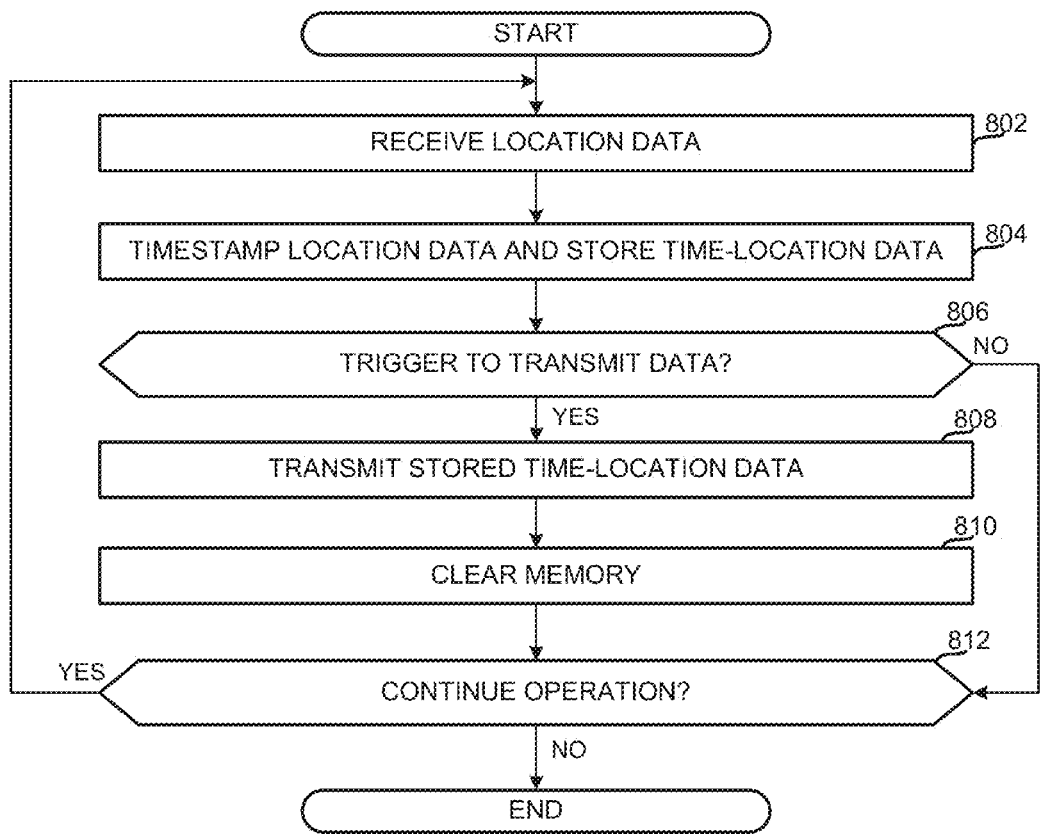
FIG. 8 is a flowchart representative of example machine readable instructions that may be executed to implement the example vehicle meter 302 of FIGS. 3 and 4.

FIG. 8 is a flowchart representative of example machine readable instructions for implementing the example vehicle meter 302 of FIGS. 3 and 4. The example of FIG. 8 begins when the location receiver 400 receives a location of the vehicle meter 302 (block 802). In the illustrated example, because the example vehicles 102 travel at high speeds around the example race track 100 during an automobile race, the example location receiver 400 receives an updated location frequently (e.g., ten times per second). After the example location receiver 400 receives a location (block 802), the example timestamper 402 retrieves the time and the example memory 406 stores the location and the time as time-location data (block 804).

The example control logic 410 then determines whether to transmit the data in the example memory 406 (e.g., based on the time elapsed since the previous transmission, the amount of data stored in the memory 406, etc.) (block 806). If the example control logic 410 determines that the data in the example memory 406 should be transmitted (block 806), then the example data transmitter 408 transmits the data in the memory 406 to the example data collection facility 314 via the example network 312 (block 808). The example memory 406 then clears its contents (block 810).

After the example memory 406 clears its contents (block 810) or after the example control logic 410 determines that the data in the memory 406 should not be transmitted (block 806), the control logic 410 determines whether to continue operation of the example vehicle meter 302 (block 812). This determination may be made, for example, based on the operating state of the vehicle 102. If the example control logic 410 determines that operation of the example vehicle meter 302 should continue (block 812), then control passes back to block 802. If the example control logic 410 determines that operation of the example vehicle meter 302 should not continue (block 812), then the example of FIG. 8 ends.

Figure 9:
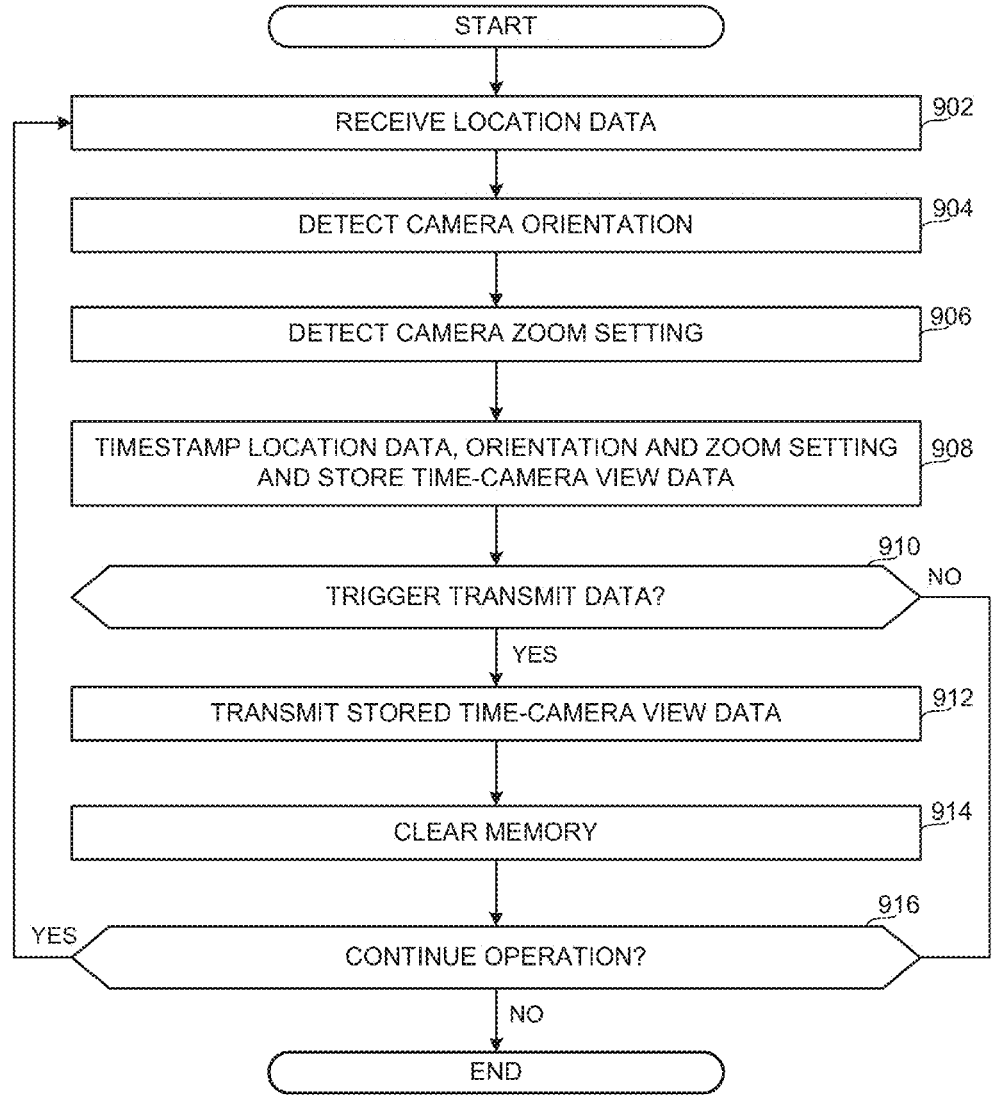
FIG. 9 is a flowchart representative of example machine readable instructions that may be executed to implement the example camera meter 306 of FIGS. 3 and 5.

FIG. 9 is a flowchart representative of example machine readable instructions for implementing the example camera meter 306 of FIGS. 3 and 5. FIG. 9 begins when the example location receiver 500 receives the location of the example camera meter 306 in an example camera 124 (block 902). The example orientation detector 504 then detects the orientation of the example camera 124 (block 904). The example zoom detector 505 then detects the zoom setting of the example camera 124 (block 906). The example timestamper 502 then retrieves the time and the example memory 506 stores the timestamp, the location, the orientation and the zoom setting as time-camera view data (block 908).

The example control logic 510 then determines whether to transmit the data in the example memory 506 (e.g., based on the time elapsed since the previous transmission, the amount of data stored in the memory 506, etc.) (block 910). If the example control logic 510 determines that the data in the example memory 506 should be transmitted (block 910), then the example data transmitter 508 transmits the data in the memory 506 to the example data collection facility 312 via the example network 312 (block 912). The example memory 506 then clears its contents (block 914).

After the example memory 506 clears its contents (block 914) or after the example control logic 510 determines that the data in the memory 506 should not be transmitted (block 910), the control logic 510 determines whether to continue operation of the example camera meter 306 (block 916). This determination may be made, for example, based on whether the automobile race has concluded. If the example control logic 510 determines that operation of the example camera meter 306 should continue (block 916), then control passes back to block 902. If the example control logic 510 determines that operation of the example camera meter 306 should not continue (block 916), then the example of FIG. 9 ends.

Figure 10:
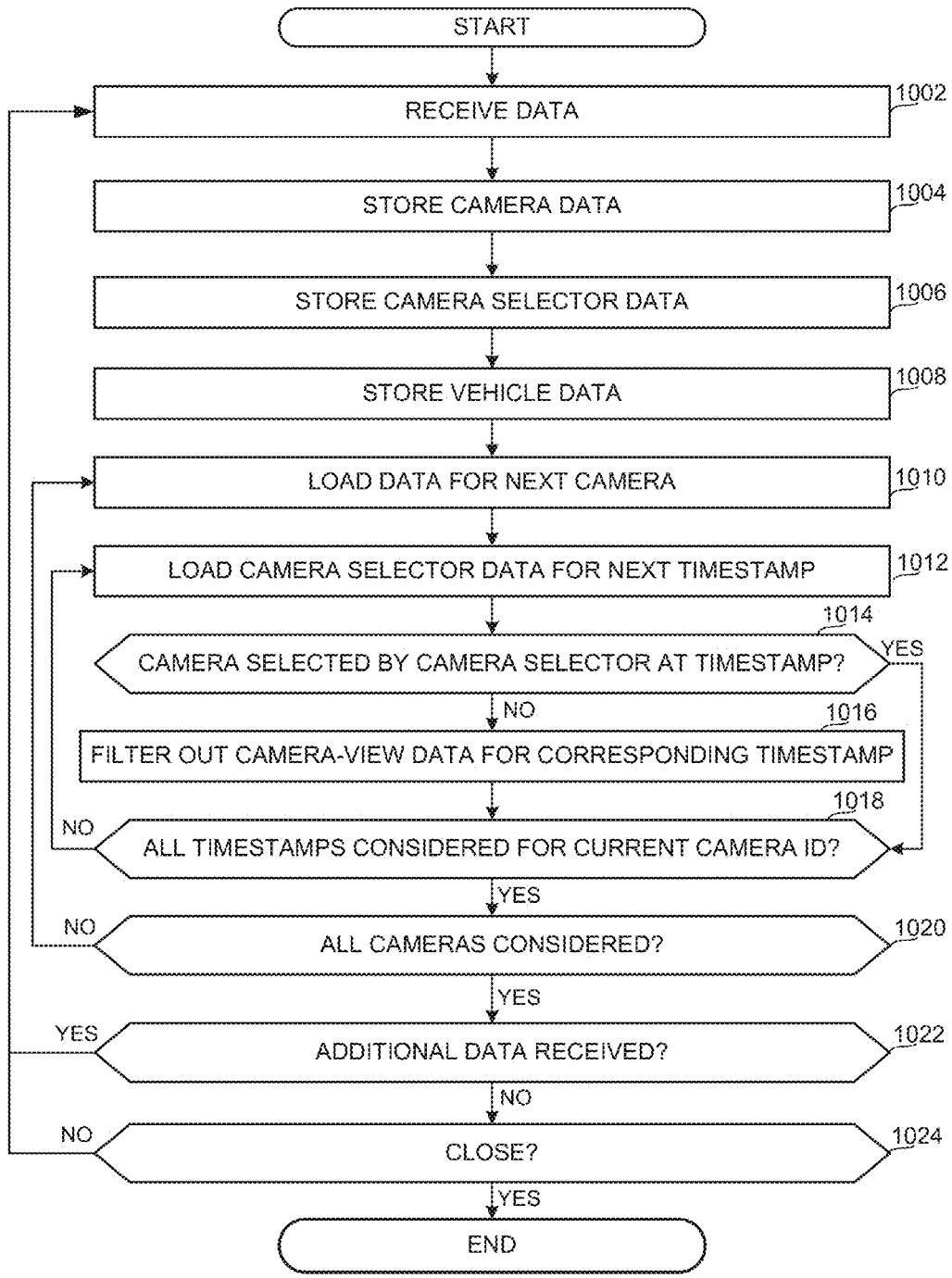
FIG. 10 is a flowchart representative of example machine readable instructions that may be executed to implement the example data collection facility 314 of FIG. 6.

FIG. 10 is a flowchart representative of example machine readable instructions for implementing the example data collection facility 314 of FIG. 6. FIG. 10 begins when the example data receiver 600 receives data from the example vehicles 102, the example cameras 124, and/or the example camera selector 308 via the example network 312 (block 1002). In the illustrated example, the data receiver 600 receives (1) time-camera view data including camera IDs, timestamps, camera locations, orientations and zoom settings from the example camera meters 306 located in the example cameras 124, (2) time-location data including vehicle IDs, timestamps and vehicle locations from the example vehicle meters 302 located in the example vehicles 102, and (3) data from the camera selector 308 indicating which camera 124 was used for the media presentation at corresponding times. The example data receiver 600 then stores the time-camera view data from the example camera meters 306 in the database 602 (block 1004). The example data receiver 600 then stores data received from the example camera selector 308 in the example database 602 (block 1006). The example data receiver 600 then stores the time-location data from the example vehicle meters 302 in the example database 602 (block 1008).

The example data filter 606 loads time-camera view data for an example camera 124 (block 1010). The example data filter 606 loads the data from the example camera selector 308 for a first time, indicating which example camera 124 was used for the media presentation at that time (block 1012). The example data filter 606 then determines whether the current example camera 124 whose data has been loaded by the example data filter 606 was selected by the example camera selector 308 at the time considered (block 1014). If the example data filter 606 determines that the example camera 124 was not selected by the example camera selector 308 at the time considered (block 1014), then the data filter 606 filters out (e.g., deletes, labeled as disregarded, etc.) the time-camera view data for the example camera 124 at the corresponding timestamp (e.g., deleting the data) (block 1016).

If the example data filter 606 determines that the example camera 124 was selected by the example camera selector 308 at the time considered (block 1014) or after the example data filter 606 filters out the time-camera view data for the example camera 124 at the corresponding timestamp (block 1016), the data filter 606 determines whether the time-camera view data for the example camera 124 has been considered for all timestamps against the data from the example camera selector 308 (block 1018). If the example data filter 606 determines that the time-camera view data for the example camera 124 has not been considered for all timestamps (block 1018), then control returns to block 1012 and the data from the example camera selector 308 for a next time is loaded.

If the example data filter 606 determines that the time-camera view data for the example camera 124 has been considered for all timestamps (block 1018), then the data filter 606 determines whether the data for all of the example cameras 124 have been analyzed by the data filter 606 (block 1020). If the example data filter 606 determines that the data for all of the example cameras 124 has not been analyzed (block 1020), then control returns to block 1010 and data for the next camera 124 is loaded.

If the example data filter 606 determines that the data for all of the example cameras 124 have been analyzed (block 1020), then the example data receiver 600 determines whether additional data has been received (block 1022). If the example data receiver 600 determines that additional data has been received (block 1022), then control returns to block 1002. If the example data receiver 600 determines that additional data has not been received (block 1022), then the example of FIG. 10 ends.

Figure 11:
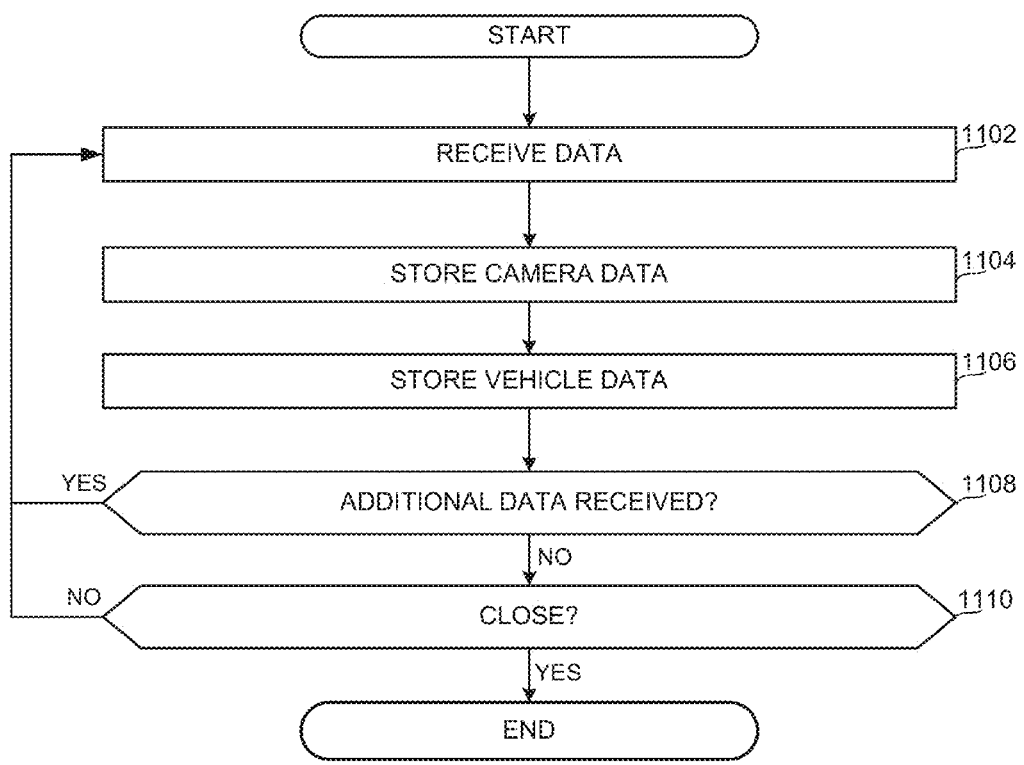
FIG. 11 is a flowchart representative of example machine readable instructions that may be executed to implement the example data receiver 700 of FIG. 7.

FIG. 11 is a flowchart representative of example machine readable instructions for implementing the example data receiver 700 of FIG. 7. FIG. 11 begins when the example data receiver 700 receives data from the example data collection facility 314 via the example network 312 (block 1102). In the illustrated example, the data receiver 700 receives time-camera view data including timestamps, camera locations, orientations and zoom settings that were sent by the example camera meters 306 located in the example cameras 124 and the data receiver 700 receives time-location data including timestamps and vehicle locations that were sent by the example vehicle meters 302 located in the example vehicles 102. The example data receiver 700 then stores the time-camera view data that was sent by the example camera meters 306 in the example camera database 702 (block 1104). The example data receiver 700 then stores the time-location data that was sent by the example vehicle meters 302 in the example vehicle database 704 (block 1106).

The example data receiver 700 then determines whether it has received additional data (block 1108). If the example data receiver 700 has received additional data (block 1108), then control returns to block 1102. If the example data receiver 700 has not received additional data (block 1108), then the data receiver 700 determines whether to close data reception (block 1110). If the example data receiver 700 determines not to close data reception (block 1110), then control returns to block 1102. If the example data receiver 700 determines to close data reception (block 1110), then the example of FIG. 10 ends.

Figure 12:
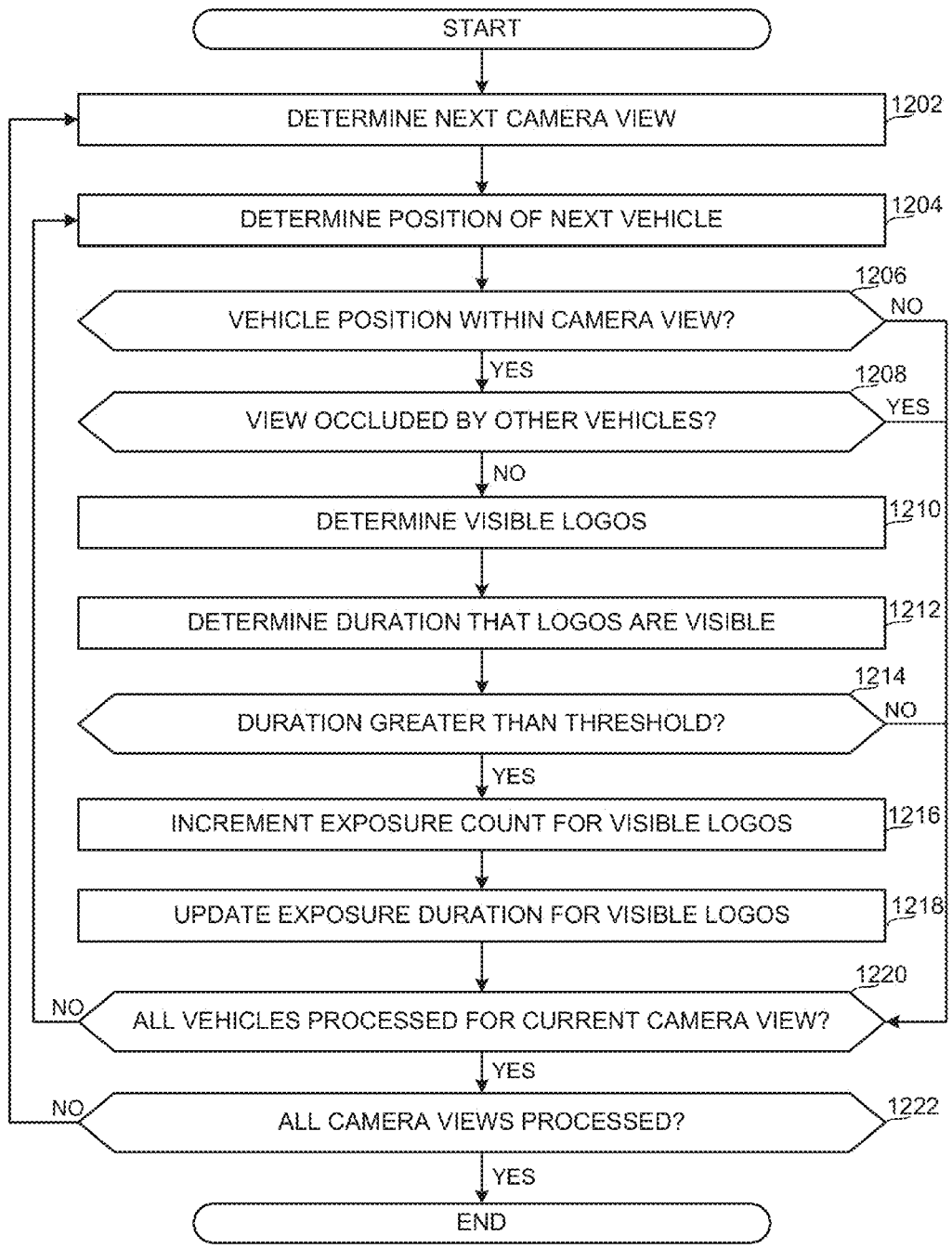
FIG. 12 is a flowchart representative of example machine readable instructions that may be executed to implement the example credit logic 720 of FIG. 7.

FIG. 12 is a flowchart representative of example machine readable instructions for implementing the example credit logic 720 of FIG. 7. The example of FIG. 12 begins when the camera view finder 706 determines a camera view by accessing the camera database 702 (block 1202). That is, the example camera view finder 706 determines the portion of the example track 100 viewed by the example camera 124 selected by the example camera selector 308 at a particular time based on the location, orientation and zoom setting of the camera 124. An example manner of implementing block 1202 is discussed in connection with FIG. 12.

The example vehicle position analyzer 708 then determines the position of one of the example vehicles 102 (block 1204). The example vehicle position analyzer 708 then determines whether the example vehicle 102 is within the camera view determined by the example camera view finder 706 (block 1206). For instance, the example vehicle position analyzer 708 determines whether the GPS coordinates of the example vehicle 102 fall within the position of the example track 100 viewable by the example camera 124 at the corresponding time. If the example vehicle position analyzer 708 determines that the example vehicle 102 is not within the camera view (block 1206), then control passes to block 1220. If the example vehicle position analyzer 708 determines that the example vehicle 102 is within the camera view (block 1206), then the example occlusion detector 710 determines whether the example vehicle 102 is occluded from the example camera 124 by one or more other vehicles (block 1208). An example manner of implementing block 1208 is discussed in connection with FIG. 14.

If the example occlusion detector 710 determines that the example vehicle 102 is occluded from the example camera 124 (block 1208), then control passes to block 1218. If the example occlusion detector 710 determines that the example vehicle 102 is not occluded from the example camera 124 (block 1208), then the example logo counter 712 determines which example logos 304 on the example vehicle 102 were visible in the camera view (i.e., viewable by the television audience) by accessing the example vehicle logo database 714 (block 1210). An example manner of implementing block 1210 is discussed in connection with FIG. 15.

After the example logo counter 714 determines which example logos 304 were viewable (block 1210), the example duration detector 716 determines the duration of time that the logos 304 were viewable (block 1212). This determination may be made, for example, by determining the set of sequential corresponding ones of the time-location data in which the logos 304 were viewable and then subtracting the time for the earliest member of the set from the time for the latest member of the set The example duration detector 716 then determines whether the logos 304 were viewable for more than a threshold amount of time (block 1214). If the example duration detector 716 determines that the example logos 304 were not viewable for more than a threshold amount of time (i.e., the duration determined at block 1212 does not exceed the threshold) (block 1214), then control passes to block 1220. If the example duration detector 716 determines that the example logos 304 were viewable for more than a threshold amount of time (block 1214), then the example credit logic 720 credits an exposure by updating the example results database 718 and incrementing the number of exposures of the viewable logos (block 1216). The example credit logic 720 then updates the total duration of the exposure of the viewable logos (i.e., the total amount of time during the race that the logos were viewable in the media presentation) by increasing the total duration in the results database 718 by the determined duration of the exposure (block 1218).

The example credit logic 720 determines whether all of the example vehicles 102 have been processed for the current camera view (block 1220). If the example credit logic 720 determines that all of the example vehicles 102 have not been processed for the current camera view (block 1220), then control returns to block 1204. If the example credit logic 720 determines that all of the example vehicles 102 have been processed for the current camera view (block 1220), then the credit logic 720 determines whether all camera views have been processed (block 1222).

If the example credit logic 720 determines that all of the example camera views have not been processed (block 1222), then control returns to block 1202. If the example credit logic 720 determines that all of the example camera views have been processed (block 1222), then the example of FIG. 12 ends.

Figure 13:
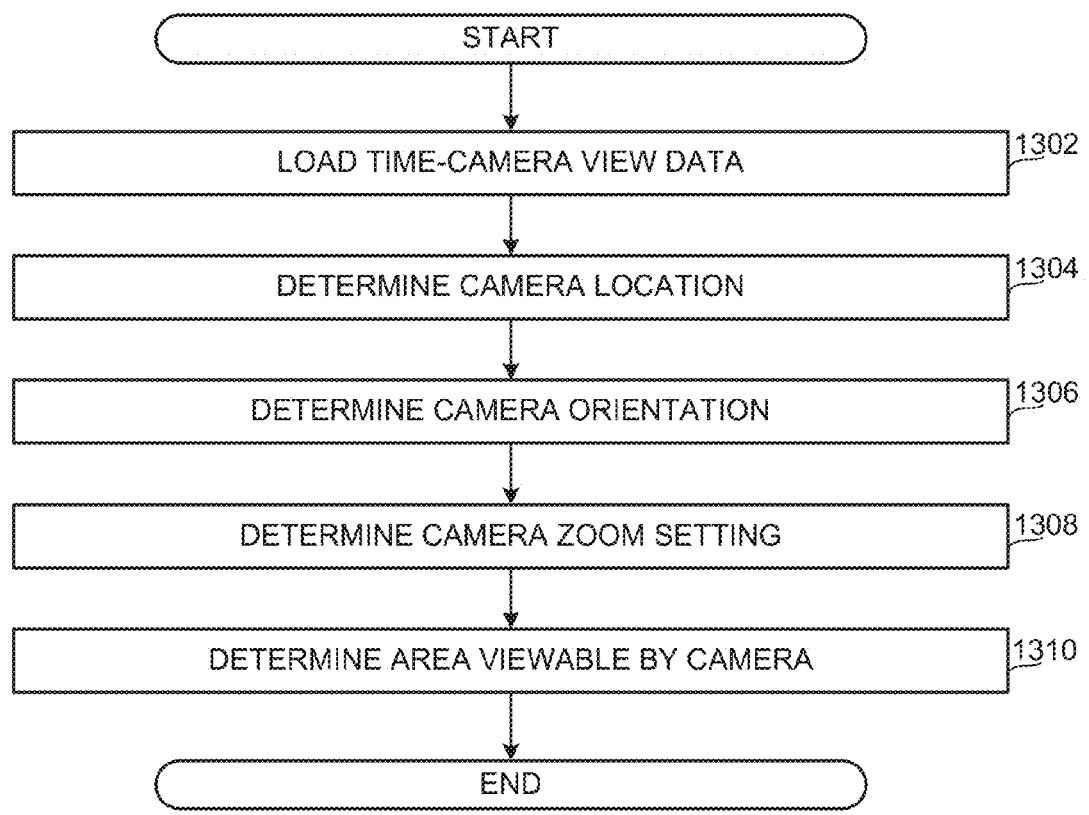
FIG. 13 is a flowchart representative of example machine readable instructions that may be executed to implement the example camera view finder 706 of FIG. 7.

FIG. 13 is a flowchart representative of example machine readable instructions for implementing the example camera view finder 706 of FIG. 7. The example of FIG. 13 begins when the camera view finder 706 loads time-camera view data for a particular time corresponding to a camera 124 (block 1302). The example camera view finder 706 then determines the location of the example camera 124 from the loaded time-camera view data (block 1304). The example camera view finder 706 then determines the orientation of the example camera 124 from the loaded time-camera view data (block 1306). The example camera view finder 706 then determines the zoom setting of the example camera 124 from the loaded time-camera view data (block 1308). The example camera view finder 706 then determines the area that was viewable by the example camera 124 based on the location, the orientation and the zoom setting of the camera 124 (block 1310). This determination may be made, for example, by calculating the area of the track 100 that is within the line of sight of the camera 124 for the zoom setting. The determined area may, for example, be translated into a set of GPS coordinates. The example process of FIG. 13 then ends.

Figure 14:
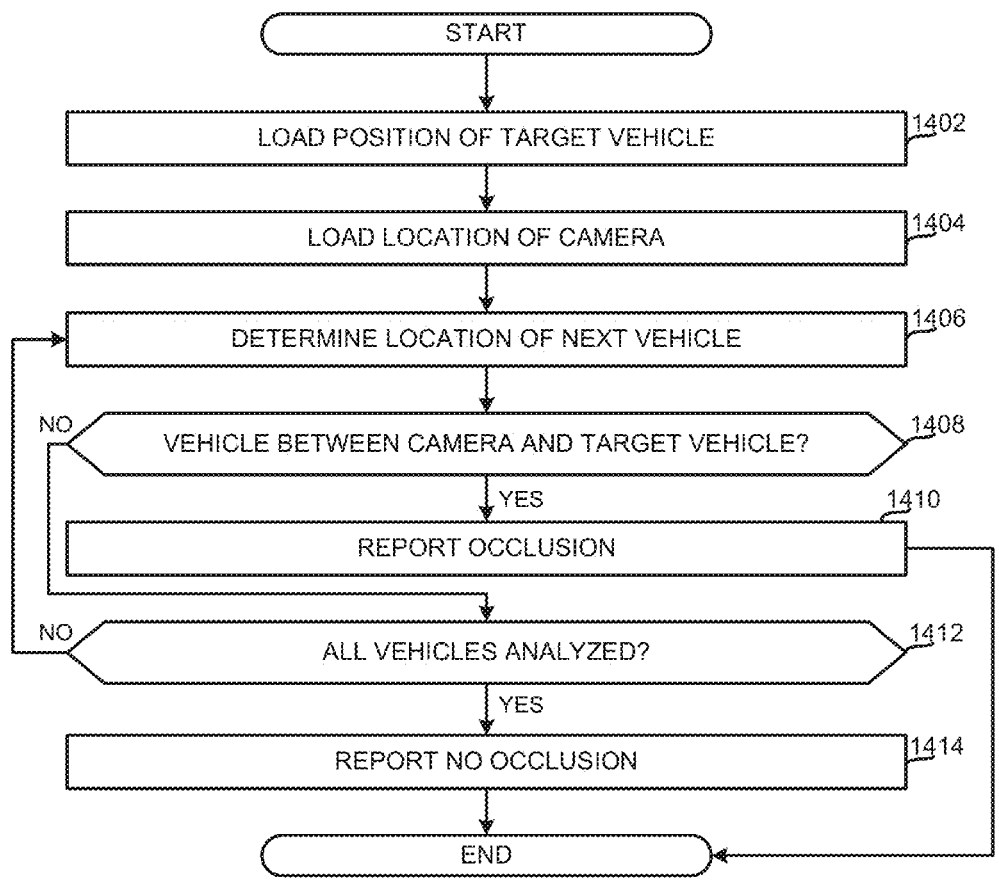
FIG. 14 is a flowchart representative of example machine readable instructions that may be executed to implement the example occlusion detector 710 of FIG. 7.

FIG. 14 is a flowchart representative of example machine readable instructions for implementing the example occlusion detector 710 of FIG. 7. The example of FIG. 14 begins when the occlusion detector 710 loads the position of the example vehicle 102 determined by the vehicle position analyzer 708 (block 1402). The example occlusion detector 710 then loads the camera view determined by the example camera view finder 706 (block 1404). The example vehicle position analyzer 708 then determines the position of one of the other vehicles in the automobile race (block 1406). The example occlusion detector 710 then determines whether the position of the other vehicle determined by the example vehicle position analyzer 708 is between the position of the example vehicle 102 and the position of the example camera 124 filming the camera view (block 1408). This determination may be made by determining if a line drawn between the camera 124 and the example vehicle 102 would pass through the other vehicle.

If the example occlusion detector 710 determines that the other vehicle is between the example vehicle 102 and the example camera 124 (block 1408), then the occlusion detector 710 outputs that there is an occlusion (block 1410) and the example of FIG. 14 ends. If the example occlusion detector 710 determines that the other vehicle is not between the example vehicle 102 and the example camera 124 (block 1408), then the occlusion detector 710 determines whether the position of all other vehicles in the automobile race have been analyzed (block 1412).

If the example occlusion detector 710 determines that the positions of all other vehicles has not been analyzed (block 1412), then control returns to block 1406. If the example occlusion detector 710 determines that the position of all other vehicles has been analyzed (block 1412), then the occlusion detector 710 outputs that there is not an occlusion (block 1414). The example process of FIG. 14 then ends.

Figure 15:
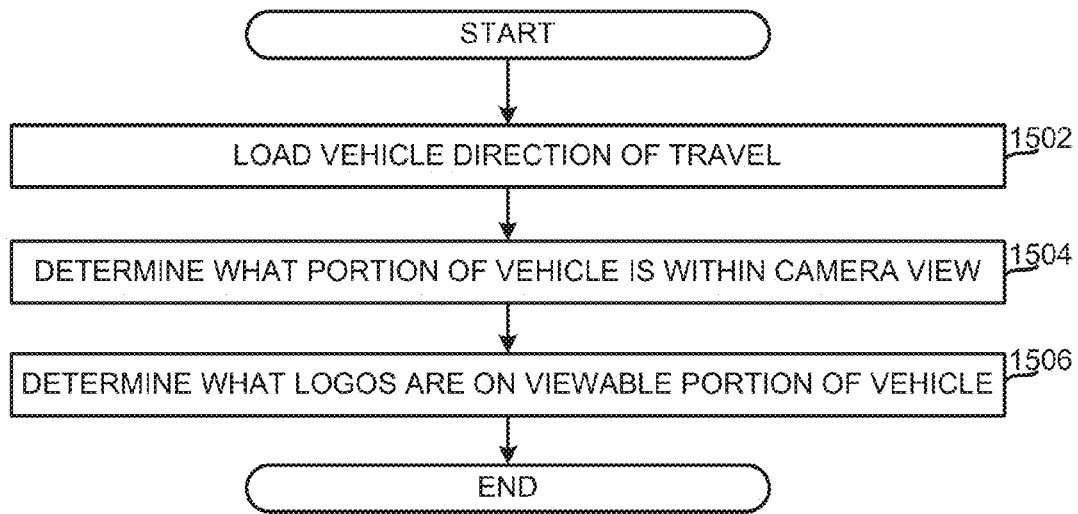
FIG. 15 is a flowchart representative of example machine readable instructions that may be executed to implement the example logo counter 712 of FIG. 7.

FIG. 15 is a flowchart representative of example machine readable instructions for implementing the example logo counter 712 of FIG. 7. The example of FIG. 15 begins when the logo counter 712 loads the direction of travel of the vehicle 102 from the vehicle position analyzer 708 (block 1502). The example logo counter 712 then determines what portion of the example vehicle 102 is within the camera view determined by the example camera view finder 706 based on the direction of travel of the vehicle 102. That is, the example logo counter 712 determines the portion of the example vehicle 102 that is facing the example camera 124 filming the camera view. The example logo counter 712 then determines which logos 304 are on that portion of the example vehicle 102 by extracting the logos through computer vision techniques and comparing the extracted logos against the logos in the example vehicle logo database 714 (block 1506). The example process of FIG. 15 then ends.

FIG. 16 illustrates an example table 1600 stored in the example results database 718. The example table 1600 illustrated in FIG. 16 relates to example exposures of three logos (logo 1, logo 2, and logo 3) during the media presentation of the automobile race. The example table 1600 lists the total number of exposure of each of the three logos during the automobile race. The example table 1600 also lists the total amount of time that each of the three ads was exposed (i.e., viewable to the audience) during the automobile race. Row 1602 illustrates that logo 1 had 75 exposures and a total exposure time of two minutes and fifty-three seconds. Row 1604 illustrates that logo 2 had 103 exposures and a total exposure time of four minutes and twenty seconds. Row 1606 illustrates that logo 3 had 98 exposures and a total exposure time of three minutes and fifteen seconds.

Demographic specific results such as those shown in second table 1600A of FIG. 16 are made possible by an audience measurement system such as that described above that collects detailed exposure metrics at multiple panelist sites. For instance, in some examples an audience measurement entity (which may or may not be the same entity associated with the data collection facility 314) registers a number of individuals who agree to have their media exposure behavior monitored as panelists. Such individuals provide the audience measurement entity with detailed demographic information about themselves or their family members. By tracking the media exposure of such persons, the audience measurement entity can determine the portion(s) of the media (e.g., the automobile race) to which different panelists were exposed. For example, the electronic media exposure meters discussed above enable collection of granular data showing that (1) panelist A was exposed to the first third of the race, then tuned out (e.g., shut off the information presentation device, left the room without shutting off the presentation device, etc.) until tuning back in for the last 10 minutes of the race, (2) panelist B was exposed to the entire race; and (3) panelist C was exposed to the following segments of the race: the first 20 minutes, time segment from 41:03 (minute:second) after the start to 44:33 (minute:second), and to the time segment from 56:03 to 58:56. Data such as this from multiple panelists can be aggregated and mapped to the corresponding demographics provided by the panelists and the statistically extrapolated to compile statistics such as those reflected in the second table 1600A of FIG. 16.

Figure 17:
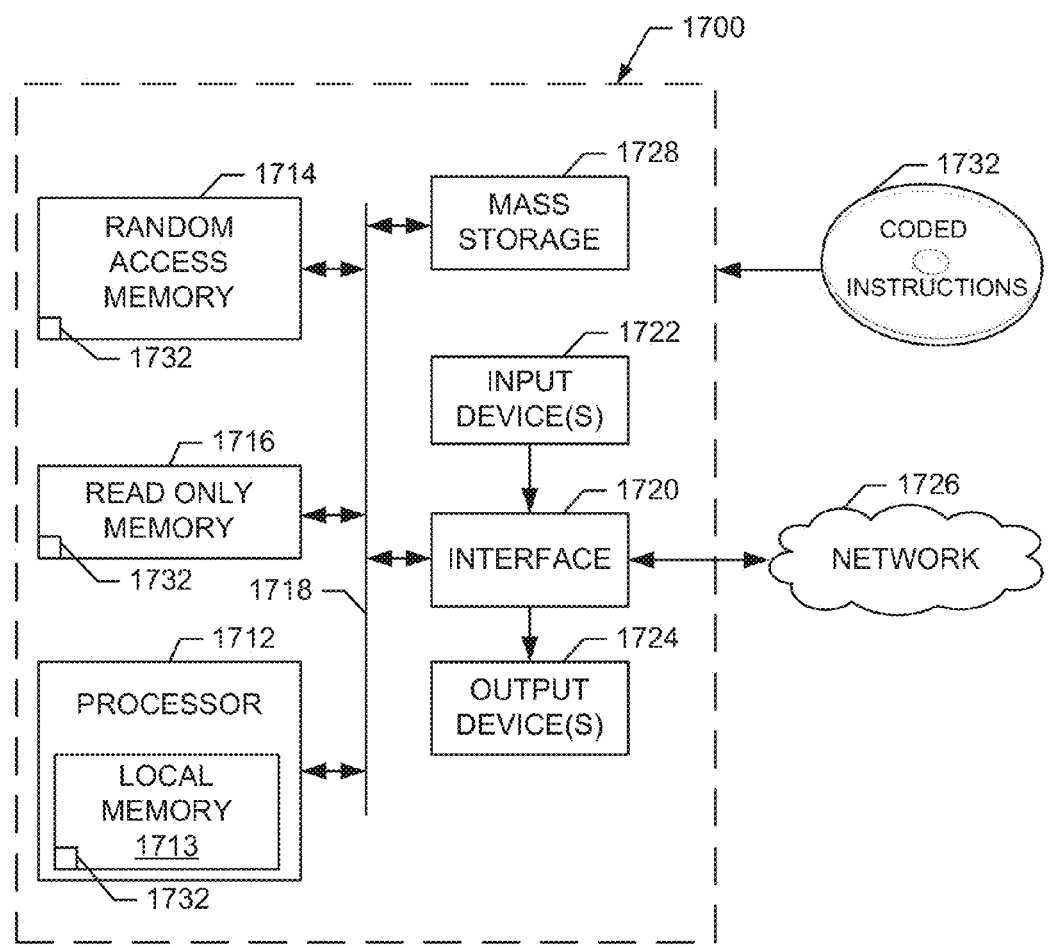
FIG. 17 is a block diagram of an example processing system capable of executing the example machine readable instructions of FIGS. 8-14 and/or 15 to implement the example vehicle meter of FIGS. 3 and 4, the example camera meter of FIGS. 3 and 5, the example data receiver of FIG. 7, the example credit logic of FIG. 7, the example camera view finder of FIG. 7, the example occlusion detector of FIG. 7, and/or the example logo counter of FIG. 7.

FIG. 17 is a block diagram of an example processor platform 1700 capable of executing the instructions of FIGS. 8-15 to implement the vehicle meter 302 of FIGS. 3 and 4, the example camera meter 306 of FIGS. 3 and 5, the example data receiver 700 of FIG. 7, the example credit logic 720 of FIG. 7, the example camera view finder 706 of FIG. 7, the example occlusion detector 710 of FIG. 7, and/or the example logo counter 712 of FIG. 7. The processor platform 1700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1720 of the illustrated example, thus, typically includes a graphics driver card.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

The coded instructions 1732 of FIGS. 8-15 may be stored in the mass storage device 1728, in the volatile memory 1714, in the non-volatile memory 1716, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a vehicle database including first time-location data identifying a first set of physical locations of a first vehicle at corresponding points in time, the first vehicle to display a first logo, the vehicle database further including second time-location data identifying a second set of physical locations of a second vehicle at the corresponding points in time;
    a camera database including time-camera view data identifying a set of views of a camera at the corresponding points in time; and
    credit logic to determine whether to credit the first logo with a first exposure to the camera based on the first time-location data and the time-camera view data, the credit logic further including an occlusion detector to determine whether the first vehicle was occluded from the camera by the second vehicle based on the first time-location data, the second time-location data and the time-camera view data, and the credit logic is to determine whether to credit the first logo with the exposure based on the determination of the occlusion detector.

2. An apparatus as defined in claim 1, wherein the credit logic includes a camera view finder to determine a first physical area viewable by the camera based on the time-camera view data.

3. An apparatus as defined in claim 2, wherein the credit logic includes a vehicle position analyzer to determine whether the first vehicle was within the first physical area by accessing the first time-location data, the credit logic further including a logo counter to determine whether to credit the first logo with the first exposure based on an output of the vehicle position analyzer.

4. An apparatus as defined in claim 3, wherein the credit logic includes a duration detector to determine whether the first vehicle was within the first physical area for more than a threshold amount of time, the credit logic to determine whether to credit the first logo with the first exposure based on an output of the duration detector.

5. An apparatus as defined in claim 1, wherein the vehicle database includes a direction of travel of the first vehicle at the corresponding points in time.

6. An apparatus as defined in claim 5, further including a vehicle logo database including logo location data that indicates a portion of the first vehicle on which the first logo is located.

7. An apparatus as defined in claim 6, wherein the credit logic includes a logo counter to determine whether the first logo was visible by the camera by determining whether the portion of the first vehicle on which the first logo is located is within a line of sight of the camera.

8. An apparatus as defined in claim 1, wherein the camera database contains second time-camera view data identifying a second set of views of a second camera at the corresponding points in time, the apparatus further including a data filter to select filtered time-camera view data identifying a filtered set of views from the time-camera view data and the second time-camera view data, the filtered set of views including the filtered time-camera view data selected by a camera selector at the corresponding points in time.

9. A method comprising:
    accessing first time-location data identifying a first set of physical locations of a first vehicle at corresponding points in time, the first vehicle displaying a first logo;
    accessing time-camera view data identifying a set of views of a camera at the corresponding points in time;
    determining a first physical area viewable by the camera based on the time-camera view data; and
    determining, with a processor, whether to credit the first logo with a first exposure to the camera based on the first time-location data and the time-camera view data by;
        accessing the first time-location data; and
        determining whether the first vehicle was within the first physical area for more than a threshold amount of time.

10. A method as defined in claim 9, wherein determining whether to credit the first logo with the exposure further comprises
    accessing second time-location data identifying a second set of physical locations of a second vehicle at the corresponding points in time; and
    determining whether the first vehicle was occluded from the camera by the second vehicle based on (1) the first time-location data, (2) the second time-location data and (3) the time-camera view data.

11. A method as defined in claim 10, further including selecting filtered time-camera view data identifying a second set of views from the time-camera view data identifying a filtered set of views of a second camera at the corresponding points in time, the filtered set of views including the filtered time-camera view data selected by a camera selector at the corresponding points in time.

12. A method as defined in claim 11, further including determining whether to credit the first logo with the first exposure based on the first time-location data and the filtered time-camera view data.

13. A method as defined in claim 9, further including accessing vehicle data including a direction of travel of the first vehicle at the corresponding points in time.

14. A method as defined in claim 13, further including accessing a vehicle logo database including logo location data that indicates a portion of the first vehicle on which the first logo was located.

15. A method as defined in claim 14, further including determining whether the first logo was visible by the camera by determining whether the portion on the first vehicle on which the first logo is located was within a line of sight of the camera.

16. A method as defined in claim 9, wherein the time-camera view data corresponds to images of the first vehicle engaged in an automobile race.

17. A method as defined in claim 9, wherein the time-camera view data identifies a geographic location and an orientation of the camera at the corresponding points in time.

18. A method as defined in claim 17, wherein the time-camera view data further identifies a zoom setting of the camera at the corresponding points in time.

19. A method as defined in claim 9, further including detecting an amount of time that the first vehicle was within the first physical area and recording the amount of time in a results database.

20. A method as defined in claim 19, wherein the set of views identified by the time-camera view data includes a media presentation, and further including:
   determining a second physical area viewable by the camera based on the time-camera view data;
   determining whether the first vehicle was within the second physical area by accessing the first time-location data;
   determining whether to credit the first logo with a second exposure based on an output of a vehicle position analyzer; and
   storing a total number of exposures for the logo over a full length of the media presentation.

21. A method as defined in claim 20, further including determining whether the first vehicle was within the second physical area for more than the threshold amount of time;
   determining whether to credit the first logo with the second exposure based on an output of a duration detector; and
   storing a total duration of the first exposure and the second exposure.

22. A method as defined in claim 20, further including determining a subset of the set of views including the media presentation, wherein the views in the subset were seen by a panelist.

23. A method as defined in claim 22, further including determining the total number of exposures in the subset.

24. A method as defined in claim 22, further including determining a total duration of the exposures in the subset.

25. A tangible machine readable storage medium comprising instructions that, when executed, cause a machine to at least:
   access first time-location data identifying a first set of physical locations of a first vehicle at corresponding points in time, the first vehicle displaying a first logo;
   access first time-camera view data identifying a first set of views of a first camera at the corresponding points in time;
   select filtered time-camera view data identifying a second set of views from the time-camera view data identifying a filtered set of views of a second camera at the corresponding points in time, the filtered set of views including the filtered time-camera view data selected by a camera selector at the corresponding points in time; and
   determine whether to credit the first logo with a first exposure to the camera based on the first time-location data and the filtered time-camera view data.

26. A machine readable storage medium as defined in claim 25, wherein the instructions, when executed, cause the machine to determine a first physical area viewable by the camera based on the time-camera view data.

27. A machine readable storage medium as defined in claim 26, wherein the instructions, when executed, cause the machine to determine whether to credit the first logo with the exposure by determining whether the first vehicle was within the first physical area by accessing the first time-location data.

28. A machine readable storage medium as defined in claim 27, wherein the instructions, when executed, cause the machine to determine whether to credit the first logo with the exposure by determining whether the first vehicle was within the first physical area for more than a threshold amount of time.

29. A machine readable storage medium as defined in claim 25, wherein the instructions cause the machine to determine whether to credit the first logo with the exposure by:
   accessing second time-location data identifying a second set of physical locations of a second vehicle at the corresponding points in time; and
   determining whether the first vehicle was occluded from the camera by the second vehicle based on (1) the first time-location data, (2) the second time-location data, and (3) the time-camera view data.

30. A machine readable storage medium as defined in claim 29, wherein the instructions, when executed, cause the machine to access vehicle data including a direction of travel of the first vehicle at the corresponding points in time.

31. A machine readable storage medium as defined in claim 30, wherein the instructions, when executed, cause the machine to access a vehicle logo database, the vehicle logo database including logo location data that indicates a portion of the first vehicle on which the first logo was located.

32. A machine readable storage medium as defined in claim 31, wherein the instructions, when executed, cause the machine to determine whether the first logo was visible by the camera by determining whether the portion of the first vehicle on which the first logo was located was within a line of sight of the camera.

* * * * *